US009635571B2

(12) United States Patent
Cheng et al.

(10) Patent No.: US 9,635,571 B2
(45) Date of Patent: Apr. 25, 2017

(54) SYSTEM AND METHOD FOR RECEPTION MODE SWITCHING IN DUAL-CARRIER WIRELESS BACKHAUL NETWORKS

(71) Applicant: BLiNQ Wireless Inc., Ottawa (CA)

(72) Inventors: Ho Ting Cheng, Stittsville (CA); Ovidiu Mihai Leulescu, Nepean (CA); Radu Bogdan Selea, Vaughan (CA)

(73) Assignee: BLiNQ Wireless Inc., Kanata (CA)

( * ) Notice: Subject to any disclaimer, the term of this patent is extended or adjusted under 35 U.S.C. 154(b) by 140 days.

(21) Appl. No.: 14/314,996

(22) Filed: Jun. 25, 2014

(65) Prior Publication Data

US 2015/0382214 A1 Dec. 31, 2015

(51) Int. Cl.
*H04W 4/00* (2009.01)
*H04W 24/08* (2009.01)
*H04W 48/16* (2009.01)
*H04W 72/08* (2009.01)
*H04W 72/04* (2009.01)

(52) U.S. Cl.
CPC ........... *H04W 24/08* (2013.01); *H04W 48/16* (2013.01); *H04W 72/0453* (2013.01); *H04W 72/085* (2013.01)

(58) Field of Classification Search
CPC  H04W 24/08; H04W 72/085; H04W 72/0453
USPC ........................................................ 370/329
See application file for complete search history.

(56) References Cited

U.S. PATENT DOCUMENTS

| 2010/0087149 A1* | 4/2010 | Srinivasan ............ H04W 16/08 455/63.1 |
| 2011/0075640 A1 | 3/2011 | Mo et al. |
| 2011/0113228 A1* | 5/2011 | Middlecamp ......... G06F 11/004 713/2 |

(Continued)

OTHER PUBLICATIONS

"Convergence of Mobile and Stationary Next-Generation Networks", ed. Krzysztof Iniewski, John Wiley and Sons, Mar. 16, 2011, p. 165.

*Primary Examiner* — Farah Faroul
(74) *Attorney, Agent, or Firm* — de Wilton Intellectual Property Inc.; Angela C. de Wilton

(57) ABSTRACT

A system and method for reception mode switching in a dual-carrier fixed wireless backhaul network is disclosed. The primary carrier is a licensed band. The secondary carrier may be a lower cost shared band or an unlicensed band. Multi-mode Remote Backhaul Modules (RBMs) comprise a first Radio Frequency (RF) chain with antenna elements for receive/transmit (RX/TX) on the primary carrier and a second RF chain with antenna elements for RX/TX on the secondary carrier. The Multi-mode RBMs adaptively switch from one reception mode to another with resource borrowing of RF and antenna elements, e.g. the secondary carrier RF chain and antenna elements can be borrowed for the primary carrier, for better reception capability for the primary carrier, reducing the number of link-budget and interference-challenged RBMs, and improving system performance. The system may comprise a dual carrier and single carrier Multiple-Input Multiple-Output (MIMO) system with variable antenna topology, having flexibility to switch dynamically between different operational modes depending on performance metrics.

26 Claims, 11 Drawing Sheets

(56) References Cited

U.S. PATENT DOCUMENTS

| | | | |
|---|---|---|---|
| 2012/0120867 A1* | 5/2012 | Horiuchi | H04B 7/155 370/315 |
| 2012/0236731 A1* | 9/2012 | Beaudin | H04W 72/082 370/248 |
| 2012/0314679 A1* | 12/2012 | Lee | H04L 5/0053 370/329 |
| 2013/0044028 A1* | 2/2013 | Lea | H01Q 21/24 342/359 |
| 2013/0128767 A1* | 5/2013 | Chun | H04W 24/10 370/252 |
| 2013/0242880 A1* | 9/2013 | Miao | H04L 5/001 370/329 |
| 2014/0043979 A1 | 2/2014 | Etemad et al. | |
| 2015/0103745 A1* | 4/2015 | Negus | H04B 15/00 370/328 |
| 2015/0305025 A1* | 10/2015 | Moraru | H04W 60/00 370/294 |
| 2015/0305047 A1* | 10/2015 | Cheng | H04W 24/02 370/248 |

\* cited by examiner

Multimode RBM

Abbreviations:
- PC-H1(2) / PC-V1(2) – Primary Carrier Horizontal / Vertical polarization 1 (2)
- SC-H / SC-V – Secondary Carrier Horizontal / Vertical polarization Abbreviations:
PC-H1(2) / PC-V1(2) – Primary Carrier Horizontal /Vertical polarization 1 (2)

Beam Selection Module – Primary Carrier

Abbreviations:
- SL-H/V – secondary carrier horizontal/vertical left antenna panel polarization
- SR-H/V – secondary carrier horizontal/vertical right antenna panel polarization
- SC-H/V – secondary carrier horizontal/vertical central antenna panel polarization Beam Selection Module – Secondary Carrier Special DL sub-frame for multi-mode selection

- Link Budget Challenged RBMs
  - (fade margin 8dB)
  - ~30% of the total RBMs

- Interference Challenged RBMs
  - ~10% of the total RBMs

SYSTEM AND METHOD FOR RECEPTION MODE SWITCHING IN DUAL-CARRIER WIRELESS BACKHAUL NETWORKS

CROSS-REFERENCE TO RELATED APPLICATIONS

This application is related to International Patent Application No. PCT/CA2011/001020 and to U.S. patent application Ser. No. 13/230,368, both of which were filed Sep. 12, 2011, entitled "System and Method for Co-Channel Interference Measurement And Managed Adaptive Resource Allocation for Wireless Backhaul", claiming priority from U.S. Provisional patent application No. 61/382,217, filed Sep. 13, 2010; this application is also related to U.S. patent application Ser. No. 13/463,478, entitled "Interference Mitigation with Scheduling and Dynamic Power Spectrum Allocation for Wireless Networks", filed May 3, 2012 claiming priority from U.S. Provisional patent applications No. 61/483,417, filed May 6, 2011 and No. 61/506,895, filed 12 Jul. 2011; all these applications are incorporated herein by reference in their entirety. This application is also related to U.S. patent application Ser. No. 14/255,068, entitled "System And Method For Coordinating Hub-Beam Selection In Wireless Backhaul Networks", filed Apr. 17, 2014, which is incorporated herein by reference in its entirety.

This application is also related to U.S. patent application Ser. No. 14/314,878, entitled "System and Method For Joint Scheduling In Dual-Carrier Wireless Backhaul Networks", filed concurrently herewith, which is incorporated herein by reference in its entirety.

TECHNICAL FIELD

The present invention relates generally to telecommunications service network technology, and particularly to a system and method for reception mode switching in dual-carrier fixed wireless backhaul networks.

BACKGROUND

Wireless backhaul networks are deployed to carry the traffic between a wireless access network and the core network. For example, as described in the above referenced related patent applications, a wireless backhaul network may comprise a plurality of Hubs, each connected to the wired core network, via Ethernet. Each Hub serves multiple remote backhaul modules (RBM), in a point to multipoint or point to point configuration, using a wireless channel. Each RBM is deployed close to an access network base station, such as a small cell base station, and connected to the base station via a cable. The Hubs are deployed at the locations where wired high capacity access to the core network is available, e.g. at a fiber point-of-presence.

In a wireless backhaul network, the term cluster refers to a number of RBMs and their respective serving Hub. Performance of an RBM, such as throughput, is contingent upon its received Carrier-to-Interference-plus-Noise Ratio (CINR) and the amount of bandwidth allocated to this RBM given a selected carrier. The received signal strength of an RBM is determined by the transmit power of a serving hub and the pathloss between the serving hub and the RBM. The received interference-plus-noise level of an RBM is determined by the transmit powers of all the interfering hubs and the pathlosses between interfering Hubs and the RBM. An RBM is affected by an interfering Hub when a desired signal and an interfering signal are transmitted over the same carrier frequency.

In frequency reuse of 1 multi-sector deployment, there are two main types of interference, namely intra-cell interference and inter-cell interference. The problem of joint scheduling has been extensively researched in multiple dimensions, e.g., time, frequency and space. Fractional frequency reuse techniques coupled with power management have been researched and many methods proposed in the literature to obtain a good performance tradeoff, the system performance of which, however, is far from an interference-free performance upper bound in terms of capacity and reliability.

To achieve the close-to upper bound performance in point-to-multi-point backhaul systems, a common approach is to use a larger spectrum (e.g., frequency reuse of 3). However, the spectrum is expensive and may not always be available for use. Another approach is to perform interference cancellation or rejection, which is generally computationally expensive and is not always effective especially with channel estimation errors. For example, techniques such as Interference Rejection Combining (IRC) or Maximal Radio Combining (MRC) may be used.

In typical wireless backhaul networks, Hubs and RBMs are deployed at fixed locations, and Hubs are located at elevated locations with sufficient height above obstacles or other environmental clutter. For example, in an urban area, Hubs may be positioned on a tall building or a rooftop, above the clutter. Each RBM is typically co-located with an access network base station, e.g. for a small cell base station, on a utility pole, sidewall of a building or other location below the roofline. Thus, typically there is not a direct Line Of Sight (LOS) between an RBM and a Hub.

According to system simulations with a typical wireless backhaul system setup, most of RBMs that are capacity challenged (0-3 b/s/Hz spectral efficiency) are in the sector-edge areas, which suffer from heavy intra-cell interference from a co-located Hub. Typically, the percentage of these capacity-challenged RBMs is in the range of 15 to 25%. If the interference created by this group could be cancelled, the overall system capacity would be close to upper bound performance for a system with a frequency reuse of 3.

Operation of dual carrier systems is described, for example, in an article by Gora, J.; Redana, S., entitled "In-band and out-band relaying configurations for dual-carrier LTE-advanced system", 2011 IEEE 22nd International Symposium on Personal Indoor and Mobile Radio Communications (PIMRC), pp. 1820-1824, 11-14 Sep. 2011 and in an article by Gong, M. X.; Shiwen Mao; Midkiff, S. F., entitled "Load- and Interference-Aware Channel Assignment for Dual-Radio Mesh Backhauls", Global Telecommunications Conference, 2008. IEEE GLOBECOM 2008. IEEE, pp. 1-6, Nov. 30, 2008-Dec. 4, 2008.

It is known to use dual carrier Multiple-Input Multiple-Output (MIMO) systems with a fixed antenna topology, such as WiFi 2.4 GHz/5 GHz.

Transmissions on different carrier frequencies usually exhibit different pathloss characteristics between the same pair of nodes. Different carrier frequencies generally have different spectrum usage characteristics, such as the amount of available bandwidth or transmit power masks, for example. To reduce or eliminate interference, a concept of joint scheduling can be utilized, to allow carrier hopping, in which a node is assigned to the carrier with a lower or zero interference level.

For dual-carrier fixed wireless backhaul networks, conventional dual carrier hardware, i.e. with a separate RF chain/separate RF front end and antenna system for each carrier, is typically not optimally used in all cell areas. There is a need for a practical scheme to more effectively use dual carrier hardware, and for systems and methods to reduce the number of link budget challenged and interference challenged RBMs in dual carrier backhaul networks.

Accordingly, an object of the present invention is to provide systems and methods for improved performance in dual-carrier wireless backhaul networks, particularly for wireless backhaul solutions comprising fixed or stationary nodes with directional antennas, including small-cell non-line-of-sight (NLOS) backhaul networks.

SUMMARY OF INVENTION

The present invention seeks to eliminate, or at least mitigate, disadvantages of known systems and method, or at least provide an alternative.

Aspects of the present invention provide a method and a system for reception mode switching in a dual-carrier wireless backhaul network, and a multi-mode remote backhaul module comprising reconfigurable dual carrier hardware.

One aspect of the invention provides a method for reception mode switching in a dual-carrier fixed wireless backhaul network comprising a plurality of nodes, said nodes comprising plurality of Hub modules, each serving a plurality of remote backhaul modules (RBMs) through Hub-RBM radio links, the method comprising deploying RBMs which are selectively operable in plurality of reception modes (multi-mode RBMs) using a primary carrier and/or a secondary carrier, wherein each multi-mode RBM comprises first and second RF chains, the first RF chain comprising RF hardware and antenna elements for receiving and transmitting (RX/TX) on the primary carrier and the second RF chain comprising RF hardware and antenna elements for RX/TX on the secondary carrier or for RX on the primary carrier;

in a data collection phase:
obtaining baseline performance measurements for each RBM operating in a baseline reception mode, us ing the first RF chain for RX/TX on the primary carrier,
identifying from said performance measurements interference-challenged or link budget-challenged RBMs,
for each interference-challenged or link budget-challenged RBMs obtaining further performance measurements for each of one or more other [available] RBM reception modes;

in a parameter selection phase:
based on said baseline performance measurements and further performance measurements for each interference-challenged RBM or link budget-challenged RBM, selecting a reception mode which provides a performance gain relative to the baseline reception mode (improved system performance);

in a parameter application phase:
for each interference-challenged RBM or link budget-challenged RBM, switching to a respective selected reception mode.

The step of selecting a reception mode for each link-budget challenged RBM or interference challenged RBM comprises, for example:
a) for link-budget challenged RBMs, selecting a first RBM reception mode with antenna/RF chain aggregation on the primary carrier, comprising operating the first RF chain and antenna elements for RX/TX on the primary carrier and operating the second RF chain and antenna elements for RX on the primary carrier; and
b) for interference-challenged RBMs, where feasible, triggering dual-carrier joint scheduling (DCJS); and otherwise selecting said first RBM reception mode with antenna/RF chain aggregation on the primary carrier.

Switching to a respective selected reception mode comprises, for example, signaling to a baseband processor of each RBM the selected reception mode, and configuring connections between the first and second RF chains of the RBM for operating in the selected RBM mode.

Selecting a reception mode for improved system performance is based on a performance gain, such as improved received CINR, for each multi-mode RBM to meet a system objective.

Selecting a reception mode for improved system performance may be carried out locally or be centrally coordinated. For example: a) by selecting a reception mode to improve received CINR based on available knowledge at the receiver of the multi-mode RBM; or b) by selecting a reception mode to improve received CINR on receiving instructions from a central processor which determines the reception mode based on information reported by network nodes.

The primary carrier is a licensed band and the secondary carrier is a lower cost shared band or an unlicensed band.

For RBMs operating on a single carrier, another reception mode may further comprise spatial domain Interference Rejection Combining (IRC) or maximal radio combining (MRC). Alternatively, another reception mode may comprise signal domain Successive Interference Cancellation (SIC), optionally combined with IRC or MRC.

In the baseline reception mode the first RF chain is configured for RX/TX on the first carrier and the second RF chain is configured for RX/TX on the secondary carrier, i.e. without aggregation or resource borrowing of elements of the first and second RF chains.

Obtaining said further performance measurements may comprise: using a special downlink/uplink (DL/UL) subframe to evaluate performance measurements for each available RBM mode.

Processing may be carried out by a centralized processing unit, e.g. a centralized control server for the network, or by a processing unit of the serving Hub of the multi-mode RBM. For example, the steps of obtaining said baseline performance measurements and said further performance measurements for each available RBM mode of interference-challenged and link-budget challenged RBMS are coordinated by a centralized processing unit of the network or performed in a processing unit of the serving Hub of the respective RBM. The RBM mode selection of each RBM is shared by signaling between each RBM and its serving Hub, and signaling between each Hub and the centralized processing unit. Switching each RBM to its respective selected reception mode comprises signaling to a baseband processor of each RBM the selected RBM mode, and configuring connections between the first and second RF chains of the RBM for operating in the selected RBM mode.

For example, the method may comprise receiving in a base band processor of a multi-mode RBM, information on the RF environment condition and determining therefrom an operational mode of the multi-mode RBM;
selecting an operational mode for each of first and second RF Front ends of the multi-mode RBM, the first RF front end acting as a transceiver for a first carrier, and the second RF front end acting either as a transceiver for a secondary carrier or as a receiver for the primary carrier;

each of the first and second RF front ends communicating with a respective first beam selection module and a second beam selection module in the selected operational mode, the beam selection modules selecting one individual antenna or a combination of antennas generating a desired beam with and direction as indicated by the base band processor; and the first and second beam selection modules being coupled by a receive path on the first carrier (RX MIMO Primary Carrier).

Advantageously, the multi-mode RBMs comprise a baseband processor, and first and second RF chains each comprise MIMO antenna systems, with N antenna elements where N≥2, dual polarization channels, and a beam selection module, and RF front ends that provide for flexibility in switching between operational modes comprising:

MIMO dual carrier operation for no interference environments and link connections for both carriers;

MIMO single carrier with IRC algorithm for high interference environments;

MIMO single carrier with MRC algorithm for in-between performance when only one carrier can be used.

Another aspect of the invention provides a system comprising a dual-carrier fixed wireless backhaul network comprising a plurality of nodes, said nodes comprising a plurality of Hub modules, each serving a plurality of remote backhaul modules (RBMs) through Hub-RBM radio links, and wherein at least some of RBMs comprise are selectively operable in plurality of reception modes (multi-mode RBMs) using a primary carrier and/or a secondary carrier, each multi-mode RBM comprising first and second RF chains, the first RF chain comprising RF hardware and antenna elements for receiving and transmitting (RX/TX) on the primary carrier and the second RF chain comprising RF hardware and antenna elements for RX/TX on the secondary carrier or for RX on the primary carrier, and switching means for switching between a baseline reception mode and one or more other reception modes; wherein in the baseline reception mode: the first RF chain operates for RX/TX on the primary carrier and the second RF chain operates for RX/TX on the secondary carrier; and wherein in the one or more other reception modes, there is aggregation or borrowing of elements of the first and second RF chains for RX/TX on the primary carrier.

Thus multi-mode RBMs are operable in a baseline reception mode where the first and second RF chains operate independently on the first and second carriers, as required, and they are also operable in one or more other reception modes with aggregation or sharing of the RF front end and antenna elements of the first and second RF chains. For example, based on performance measurements for Hub-RBM links of the network or part of the network, the switching means comprises a processing unit that may be part of a centralized control server or part of a serving Hub for the multi-mode RBM. For example, a) the switching means comprises a processing unit configured for selecting a reception mode to improve received CINR based on available knowledge at the receiver of the RBM; or b) the switching means comprises a processing unit configured for selecting a reception mode to improve received CINR on receiving instructions from a central processor which determines the selected reception mode based on information reported by network nodes.

In a preferred embodiment each multi-mode RBM comprises a first MIMO RF front end that supports the primary carrier for TX/RX MIMO mode and a second MIMO RF front end that supports the secondary carrier for TX/RX MIMO mode and the primary carrier for RX MIMO mode.

Preferably, the antenna elements of each multi-mode RBM comprise a multibeam antenna and each antenna provides dual polarizations per carrier, and each RBM further comprises a beam selection module for each of the primary and secondary antenna elements.

The antenna system of each multi-mode RBM comprises N antenna panels per carrier, where N≥2, e.g. 4, 6, 8, etc.

Each beam selection module functions for at least one of: combining multiple beams to generate narrower and wider beams; selecting antenna polarization to increase MIMO capabilities per carrier; and selecting 2 separate antennas for the primary carrier.

The first and second antenna systems comprise a respective first and second beam selection module, and the first and second beams selection modules communicate for RX MIMO on the primary carrier.

Another aspect of the invention provides a multi-mode remote backhaul module (RBM) for a dual carrier fixed wireless backhaul network. Preferably each of the first and second RF chains comprises MIMO multibeam antenna elements, a, beam selection module, and a respective RF front end. The beam selection modules of the first and second RF chains are coupled to enable borrowing of resources of the second RF chain for operation as a receiver on the primary carrier. Preferably, each RF chain comprises dual polarization channels.

Thus the multi-mode RBM may be operated in different RBM reception modes, for example a baseline reception mode where first and second RF chains are dedicated respectively for TX/RX on primary and secondary carriers. Alternatively, depending on the network environment conditions, if the RBM is interference challenged or link capacity challenged, the one or more other reception modes may be selected to take advantage of aggregation or sharing of elements of first and second RF chains for operation on the primary carrier.

Another aspect of the invention comprises a computer readable storage medium storing instructions (software) for execution in a processing unit of a wireless backhaul network or network server for implementing a method for reception mode switching.

Thus systems and methods of the present invention provide for use of multi-mode RBMs where resources of RF chains and antenna elements on the secondary carrier are borrowed to form a better receiver on the primary carrier. The antenna topology design accommodates different antenna requirements for each operational mode and the RF hardware is designed to facilitate selection of one of multiple antenna options for the primary and secondary carriers. Preferably, the RF hardware provides for software selection of one of several RBM reception modes, dynamically as a function of the environment, i.e. based on measurements of performance on each available reception mode, such as Single Carrier IC, Single Carrier MRC or Dual Carrier system. In particular, borrowing or aggregation of RF and antenna elements of a dual-carrier hardware platform allows dynamic reception mode switching on the primary carrier.

System and methods according to embodiments of the invention provide practical schemes for RBM mode selection in dual-carrier wireless backhaul systems to more optimally use dual carrier hardware, and to reduce the number of interference-challenged or link-budget challenged RBMs.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

The patent or application file contains at least one drawing executed in color. Copies of this patent or patent application publication with color drawing(s) will be provided by the Office upon request and payment of the necessary fee.

DESCRIPTION OF EMBODIMENTS

A system and method for reception mode selection in a dual carrier wireless backhaul network will be described, by way of example, with reference to a NLOS wireless backhaul network 100 as illustrated schematically in FIG. 1, which represents schematically the topology of a system comprising a point-to-multipoint wireless backhaul network, comprising a plurality of fixed nodes. The nodes comprise a plurality of Hubs 102 and RBMs 104.

Figure 1:
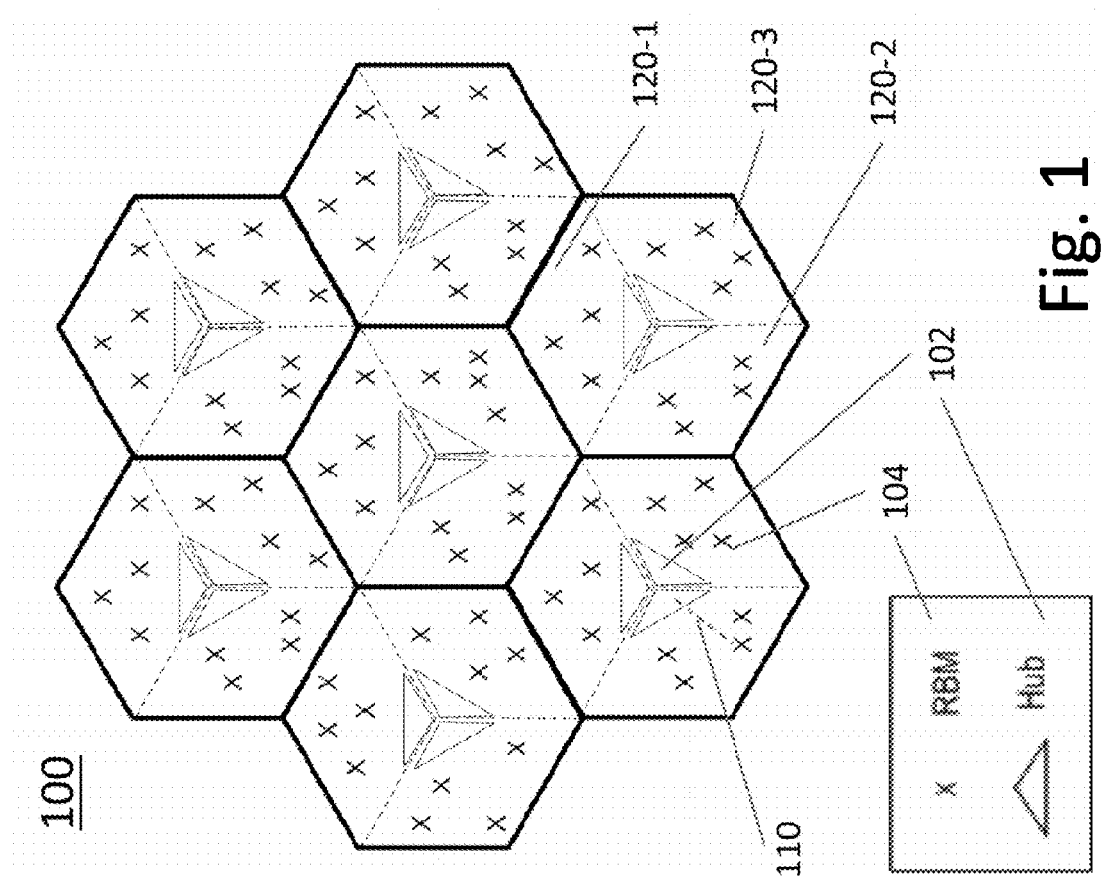
FIG. 1 shows a schematic diagram of a wireless backhaul network comprising a plurality of Hubs, each Hub serving a plurality of Remote Backhaul Modules (RBMs) for implementing a method for RBM mode selection according to an embodiment of the present invention.

As an example only, the wireless backhaul network 100 shown in FIG. 1 comprises a plurality of seven sites or cells, each site comprising three Hub modules 102, with each Hub module serving a sector 120 comprising a cluster of a plurality of Remote Backhaul Modules (RBMs) 104. Thus, there are 21 sectors, each with a Hub module 102 serving a cluster of up to four RBMs. As shown, three Hubs modules 102, each with directional antenna, are co-located in each of the cell centers, with a cluster of RBMs mapped to each respective serving Hub, in each of the three sectors 120-1, 120-2, 120-3 of the cell.

Figure 2:
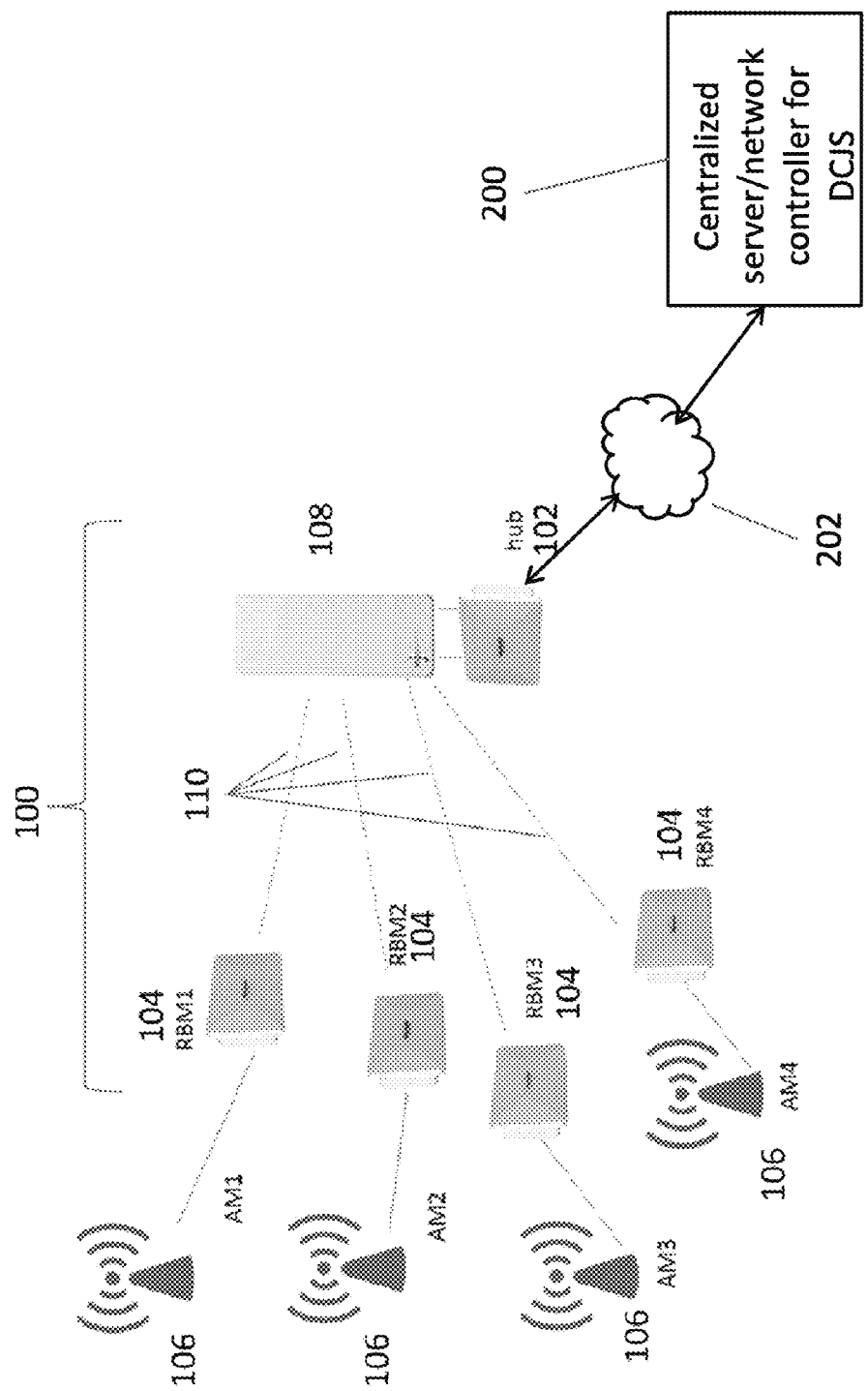
FIG. 2 shows a schematic diagram of part of the wireless backhaul network comprising one cluster of four RBMs served by a Hub module, each RBM being connected to an access module of an access network, and wherein the Hub has a connection to a centralize control server.

In each sector 120, a Hub 102 serves its set or cluster of Remote Backhaul Modules (RBMs) 104 through wireless links (Hub-RBM radio links) 110, as shown schematically in FIG. 2. Each RBM 104 communicates with and is co-located with an access module (AM) 108 of an access network, such as a small cell-base station, using a wired connection, e.g. an Ethernet cable. The Hub module 102 may have a multibeam antenna 108 and RBMs 104 each have an integrated directional antenna system that is directed towards the Hub. Unlike a multi-hop architecture, each radio link 110 comprises only one hop from each RBM 104 to a respective Hub to carry the traffic. It is also different from the relay system where the access links and relay links share the same radio frequency band. The backhaul network operates at a different frequency band from that of the access network. Also shown in FIG. 2 is a communications link 202 from the Hub 102 to a centralized server or controller 200, for managing control functions of the wireless backhaul network.

Conventionally, as described in the above referenced related US patent applications, the wireless backhaul network is operated using a single carrier, i.e. a licensed band, and the frequency reuse factor of the system is 1. In a wireless backhaul network according to embodiments of the present invention, the system is operated with dual carriers comprising a primary carrier and a secondary carrier. The primary carrier is a licensed band and the secondary carrier is an unlicensed band or other lower cost, shared frequency band. The secondary carrier may comprise one or more channels. As described in the above referenced related US patent application entitled "System and Method For Joint Scheduling In Dual-Carrier Wireless Backhaul Networks", where the secondary channel has n channels, a method for Dual Carrier Joint Scheduling (DCJS) is provided in which f0 is the primary carrier, and f1, f2 . . . fm, are virtual channels of the secondary carrier, i.e. unlicensed band. This provides a virtual frequency reuse of 1.

RBM Reception Mode Selection

Embodiments of the present invention provide dual wireless backhaul networks wherein at least some of the RBMs comprise multi-mode RBMS with RBM reception mode selection capabilities. That is the multi-mode RBMs are multi-mode receivers having a baseband processor, dual RF front ends, dual mode selection modules, and dual antenna modules as illustrated schematically in the block diagram of FIG. 3. RBM mode selection may be implemented with or without DCJS. Thus, DCJS will first be briefly introduced, and then the multi-mode RBM hardware will be described with reference to FIG. 3.

Dual Carrier Joint Scheduling (DCJS).

In wireless NLOS backhaul networks, the goal of joint scheduling is to optimize the system performance by proper carrier and channel assignment to each RBM. The performance of an RBM is generally governed by its achievable throughput, which is a function of the amount of allocated bandwidth and its CINR. In essence, the spectral efficiency ($SE_{ij}$) on the jth channel of the ith carrier is a function of CINR, for instance $SE_{ij}=\log_2(1+CINR_{ij})$, where $CINR_{ij}$ is the received CINR on the jth channel of the ith carrier. The throughput on the jth channel of the ith carrier can be computed as follows: $Thpt_{ij}=W_{ij}SE_{ij}$, where $W_{ij}$ is the amount of allocated bandwidth on the jth channel of the ith carrier, and $CINR_{ij}$ is the received CINR on the jth channel of the ith carrier.

In a dual-carrier wireless backhaul system, comprising a primary licensed band and a secondary unlicensed band, the procedure of joint scheduling comprises channel measurement of an appropriate performance metric, carrier assignment, channel assignment, and resource allocation.

An RBM is first associated to its serving Hub based on a predefined metric, such as distance, or other method of clustering RBMs to a serving Hub. On the primary carrier, the channel quality for each RBM-to-Hub radio link is measured and populated into a lookup table, referred to as radio frequency environment characteristics (RFEC) Table or Matrix. Methods for channel quality measurement are described in related U.S. patent application Ser. No. 13/230,368, filed on Sep. 12, 2011, entitled "System and Method for Co-Channel Interference Measurement And Managed Adaptive Resource Allocation for Wireless Backhaul". The latter application refers to the RFEC table as a "MARA Matrix". The RFEC table or RFEC matrix effectively provides an interference or performance map for all radio links of the wireless backhaul network, with each entry of the matrix representing a performance metric for a radio link between $Hub_i$, and $RBM_j$. The RFEC matrix is preferably stored in a centralized server 200, e.g. a network control server, which is in communication with each Hub and manages joint scheduling and channel allocation across the wireless backhaul network. The centralized server may also manage power control or other functions. To account for the changes in the network environments, channel quality measurements can be done on a periodic or regular basis, to update the RFEC table (MARA Matrix) as required.

Based on the channel quality measurements, e.g. measurement of pathloss or channel gain for each Hub-RBM radio link ij, the received CINR of each RBM is estimated and hence an estimated spectral efficiency is computed. Assignment of each RBM to the primary or secondary carrier is made based on the computed spectral efficiencies Sij for each Hub-RBM radio link ij.

Various algorithms or schemes may be used for implementing DCJS based on the computed spectral efficiencies. For example, RBMs with poor spectral efficiencies, which have good channel gains with respect to their interfering Hubs, are assigned to the secondary carrier, and the rest of the RBMs are assigned to the primary carrier. In another example, RBMs with good channel gains with respect to their serving Hubs are assigned to the secondary carrier, and the rest of the RBMs are assigned to the primary carrier. Referring to the above referenced related co-pending U.S. patent application Ser. No. 14/314,878, for implementation of Dual Carrier Joint Scheduling (DCJS), RBMs are assigned to the primary carrier based on performance metrics on the primary carrier, e.g. RBMs having a performance metric above a threshold are assigned to the primary carrier. For example, performance metrics are obtained by performing Radio Frequency Environmental Characteristics (RFEC) measurements to generate an RFEC table or interference map having entries for each Hub-RBM radio link of the network which is maintained by the centralized server. RBMs having a performance metric above a performance threshold, such as a spectral efficiency above a threshold value, are assigned to the primary carrier. Other RBMs, i.e., interference-challenged RBMs, are assigned to the secondary carrier. Performance metrics are then obtained for each RBM assigned to the secondary carrier for each time slot and for each channel of the secondary carrier. RBMs on the secondary carrier are then assigned to a slot and channel of the secondary carrier based on channel availability. A table is generated and stored by the centralized server with a list of RBMs assigned to the primary carrier. Another table is generated and stored by the centralized server with a list of RBMs assigned to the secondary carrier. The latter table also provides an RBM specific channel assignment.

The assignment of RBMs to carriers is not rigid and can be changed dynamically, i.e. DCJS uses a frequency hopping frame structure. Preferably, a fallback channel on the secondary carrier is assigned to each RBM.

For example, after carrier assignment, the service level agreement for each RBM is verified, and if additional resources are available in the secondary carrier, these may be assigned. The second carrier assignment assigns specific channels to each RBM but does not necessarily specify the number of sub-frames (time slots) to schedule for each RBM. However, for tighter scheduling, with zone coordination, specific time sub-frames or time slots are indicated by a sub-frame index for a specific channel assignment on the second carrier.

The centralized server 200 (FIG. 2) stores the RFEC table of metrics for each Hub-RBM radio link. The centralized server 200 also maintains a database of RBMs on the primary and secondary carriers. A table of channel assignments on the secondary carrier is also stored in the centralized server. The table of channel assignments includes a primary channel and one or more fallback channels are also recorded. The server 200 communicates with Hubs and RBMs using control signalling messages transmitted on the primary carrier.

After assignment is completed, the service level agreement (SLA) for each RBM is verified. If additional resources are left in the secondary carrier (unlicensed band) these resources can be assigned. The assignment is not rigid and can be changed dynamically. Preferably, each RBM would have a default or "fallback" channel of the secondary carrier. The assignment need not necessarily specify the number of sub-frames to schedule for each RBM, but the assignment does provide specific channels that a particular RBM is allowed to use. In the case that tighter joint scheduling is required, with zone coordination, a position index of the sub-frame is also specified with the channel assignment.

The control channel is always on the primary carrier and carries messages signalling secondary channel and fallback channel assignment changes, and optionally also carries the position index when zone coordination is implemented.

DCJS may be implemented locally, e.g. on a per-sector or per-site basis. It may be implemented with a fixed Hub-beam and channel assignment, or with both Hub-beam selection and channel assignment. DCJS may further be implemented on a per-neighbourhood basis, i.e. across multiple sites, or across the entire wireless backhaul network.

Multi-Mode RBM Hardware

Figure 3:
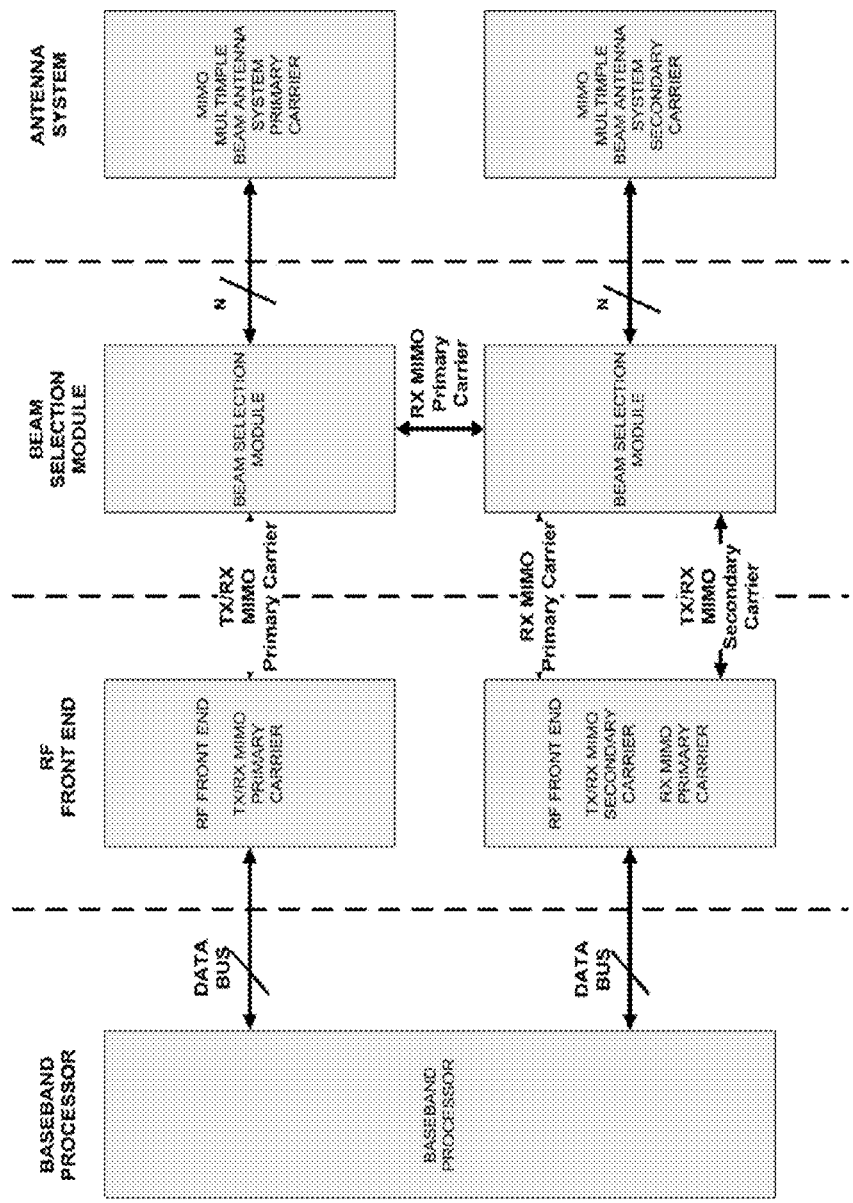
FIG. 3 shows a schematic block diagram of a multi-mode RBM for implementation of RBM mode selection according to an embodiment of the present invention.

As shown in FIG. 3, each multi-mode RBM comprises a baseband processor, which is coupled by a respective data bus to first and second RF front ends. The first RF front end provides TX/RX MIMO for the primary carrier. The second RF front end provides TX/RX MIMO for the secondary carrier or provides RX MIMO on the primary carrier. The first RF front end is coupled through a respective first beam selection module to a MIMO multiple beam antenna system for the primary carrier. The second RF front end is coupled through a respective second beam selection module to a MIMO multiple beam antenna system for the secondary carrier. The first and second beam selection modules are coupled by RX MIMO on the primary carrier. Thus the multi-mode RBM comprises first and second RF chains which allow for resource borrowing or aggregation for operation in different reception modes using one or both of the primary and secondary carriers.

Figure 4:
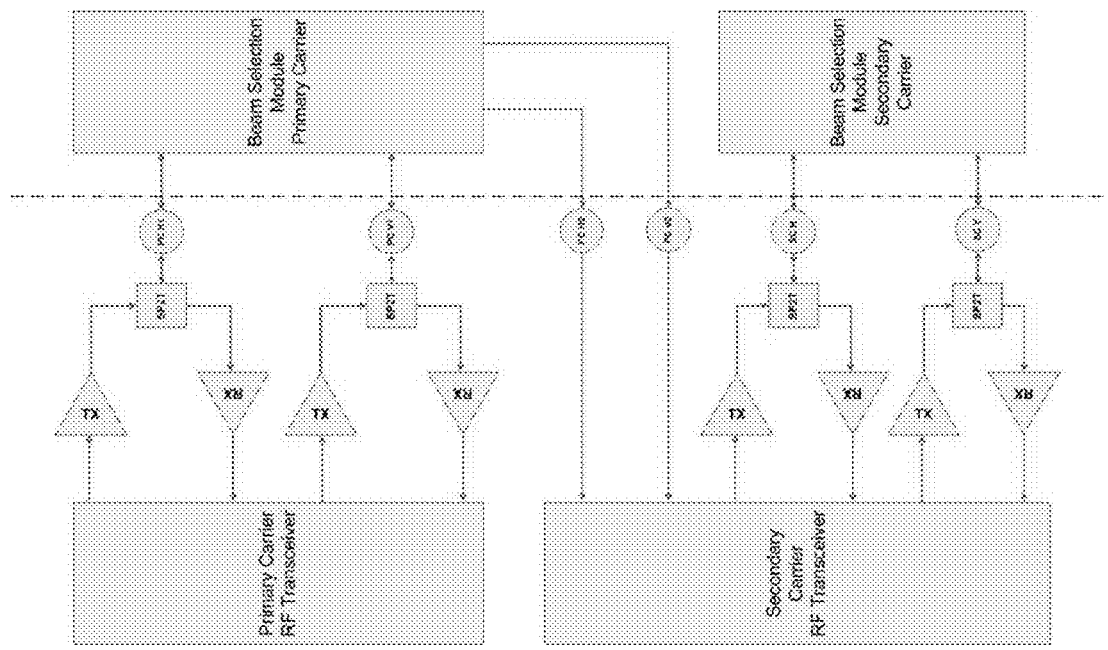
FIG. 4 shows a schematic block diagram of a multi-mode RBM similar to that shown in FIG. 3, showing more details of elements of the first and second RF front chains, comprising primary carrier and secondary carrier RF front ends and respective first and second beam selection modules.

Further details of the receive and transmit channels between the first and second RF front ends and the first and second beam selection modules are shown in FIG. 4.

Figure 5:
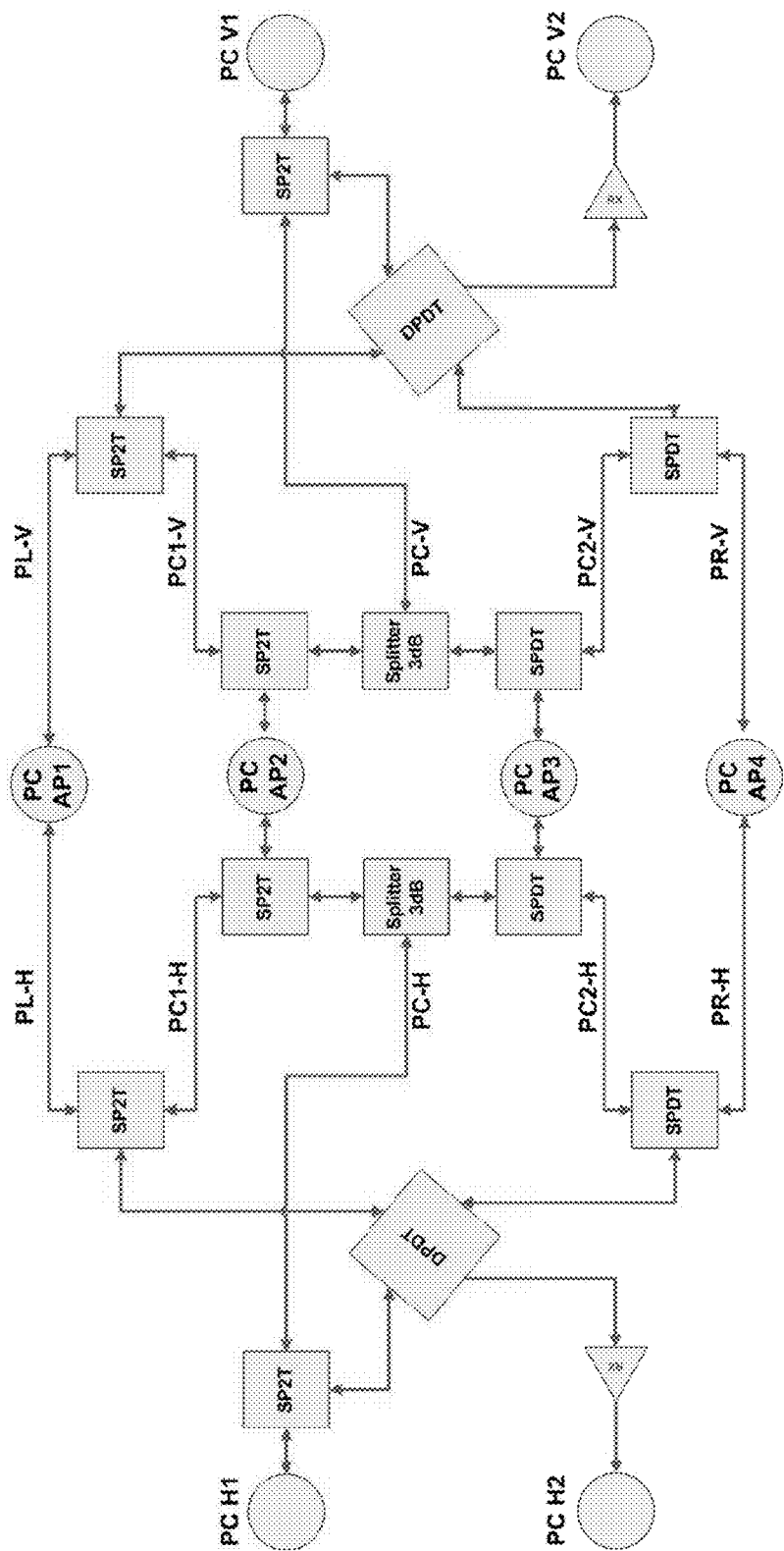
FIG. 5 shows a schematic block diagram of the first beam selection module for the primary carrier.
Figure 6:
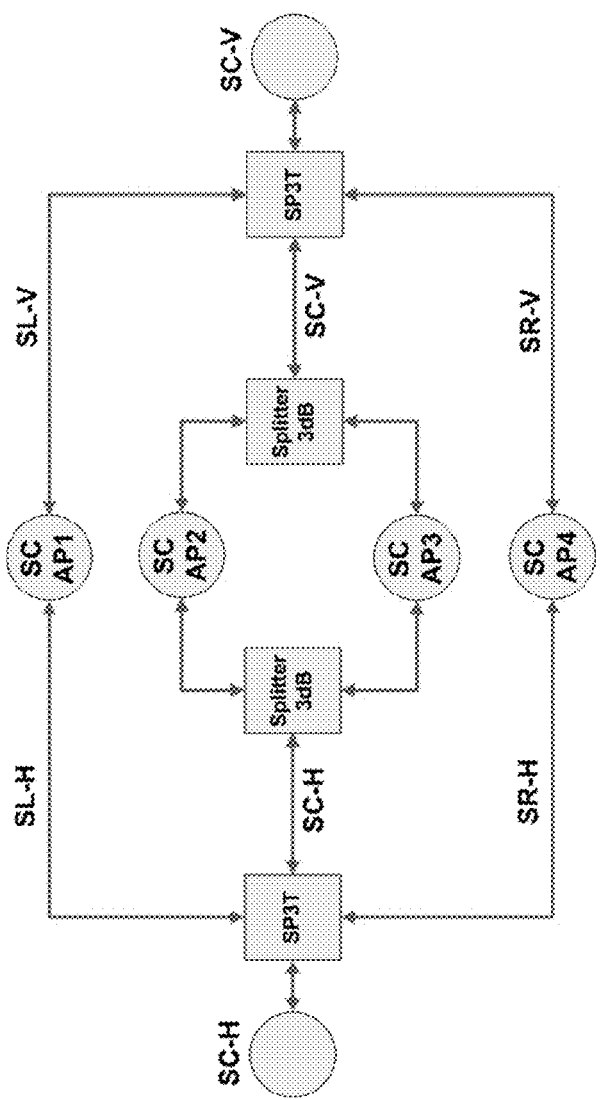
FIG. 6 shows a schematic block diagram of the second beam selection module for the secondary carrier.

In the systems illustrated in more detail in FIGS. 4, 5, and 6, the antenna system comprises dual polarizations per carrier (e.g. Horizontal H and Vertical V polarizations), and N antenna panels per carrier, e.g. N≥2.

Antenna System

The antenna system according to the embodiment illustrated in FIGS. 4, 5 and 6 is based on 2 groups of N antenna elements, one group for the primary carrier and one group for secondary carrier For example, for N=4 for each group, each group includes 4 antenna panels, named as:
Primary carrier—PC AP1, PC AP2, PC AP3, PC AP4
Secondary carrier—SC AP1, SC AP2, SC AP3, SC AP4
Each antenna panel comprises a dual polarization system. In this embodiment, the antenna system design and the beam selection modules provide the ability to operate in any one of the following modes:
 Dual Carrier MIMO Self-Install system with an antenna coverage of 200 deg.
 Single Carrier MIMO Self Install with MRC and having an antenna coverage of 100 deg.
 Single Carrier MIMO Self Install with IC and having an antenna coverage of 100 deg The primary beam selection module shown schematically in more detail in FIG. 5. The first Beam Selection Module supports TX/RX MIMO on the primary carrier and provides an alternative for a secondary RX MIMO configuration. As a function of the operational requirements, the first Beam Selection Module offers the capability to select 1 antenna or 2 separate antennas for each polarization (Horizontal H and Vertical V). The secondary beam selection module is shown schematically in more detail in FIG. 6. As illustrated, the first and second beam selection modules provide for combining multiple beams to generate narrow and wider beams, selection of antenna polarization to increase MIMO capability per carrier, and selection of 2 separate primary carrier antennas.

List of antenna selection abbreviations shown in FIGS. 4 and 5:
 PL-H/V—primary carrier horizontal/vertical left antenna panel polarization
 PR-H/V—primary carrier horizontal/vertical right antenna panel polarization
 PC1-H/V—primary carrier horizontal/vertical central 1 antenna panel polarization
 PC2-H/V—primary carrier horizontal/vertical central 2 antenna panel polarization
 PC-H/V—primary carrier horizontal/vertical central combined antenna panel polarization. These antennas are a combination of PC1 and PC2.

List of antenna selection abbreviations shown in FIG. 6:
 SL-H/V—secondary carrier horizontal/vertical left antenna panel polarization
 SR-H/V—secondary carrier horizontal/vertical right antenna panel polarization
 SC-H/V—secondary carrier horizontal/vertical central antenna panel polarization Referring to FIGS. 4 and 5, for example: if only one antenna/polarization is required the system can select any of the following configurations:
 PL-H/V
 PC1-H/V
 PC2-H/V
 PC-H/V
 PR-H/V.

If two antennas/polarization are required the system can select any of the following pairs of configurations:
 PL-H/V and PC2-H/V
 PL-H/V and PC-H/V
 PR-H/V and PC1-H/V
 PR-H/V and PC-H/V
 PC1-H/V and PC2-H/V In addition to the above configurations, the design supports a separate antenna selection algorithm for each of the two polarizations. This adds system flexibility and increases the ability to properly select the antennas in a NLOS interfering environment.

Referring to FIG. 6, the Secondary Carrier Beam Selection Module supports TX/RX MIMO for the Secondary Carrier RF Front End. The design supports a separate antenna selection algorithm for each of the two polarizations. This adds system flexibility and increases the ability to properly select the antennas in a NLOS interfering environment Multi-Mode RBM Operation Based on obtaining or receiving performance metrics, such as RFEC measurements, from the serving Hub, the baseband processor of a multi-mode RBM selects which RBM operational mode to use and configures the first and second RF front end chains for the desired carrier operation. It also indicates which beam configuration is more appropriate for the specific application.

Following the baseband processor decision, each RF Front End will operate as a transceiver for the dedicated carrier or as a receiver for the other carrier. Also, following the Base Band processor decision, each RF Front End can connect to the required antenna system by using the allocated Beam Selection Module or by a direct connection to the second Beam Selection Module. The Beam Selection Module is able to select one individual antenna or a combination of a few antennas generating the desired beam width and direction as indicated by the Base Band Processor. At the same time, the Beam Selection Module dedicated to one RF Front End will provide the path between the dedicated Carrier antenna system and the second RF Front End module. The Beam Selection Module can connect each MIMO polarisation channel to a different antenna or to a different combination of antennas generating a different beam for each MIMO polarisation.

Method for RBM Reception Mode Selection

First, performance measurements, such as RFEC measurements are carried out, using a baseline reception mode, to determine which multi-mode RBMs are link budget challenged or interference challenged on the primary carrier. In the baseline reception mode the first and second RF chains receive and transmit on the respective primary and secondary carriers, without resource borrowing or aggregation.

For link budget challenged multi-mode RBMs, mode selection with antenna/RF chain aggregation is triggered on the primary carrier to improve reception capability. For interference challenged multi-mode RBMs, if feasible, DCJS is applied, and if DCJS is not feasible, RBM mode selection with antenna/RF chain aggregation is triggered.

After network entry, a special DL/UL subframe is used for an RBM to evaluate performance of each of the feasible reception modes, including the baseline reception mode. A performance metric for each available reception mode is compared to that for the baseline reception mode, to obtain a delta difference, such as a CINR difference. An RBM mode selection is made to maximize a network utility, and the selected mode and its delta gain is reported to the RBM's serving Hub. Note that, when dual-carrier joint scheduling is being used, the delta gain difference is required by the serving Hub for implementation of DCJS.

Figure 7:
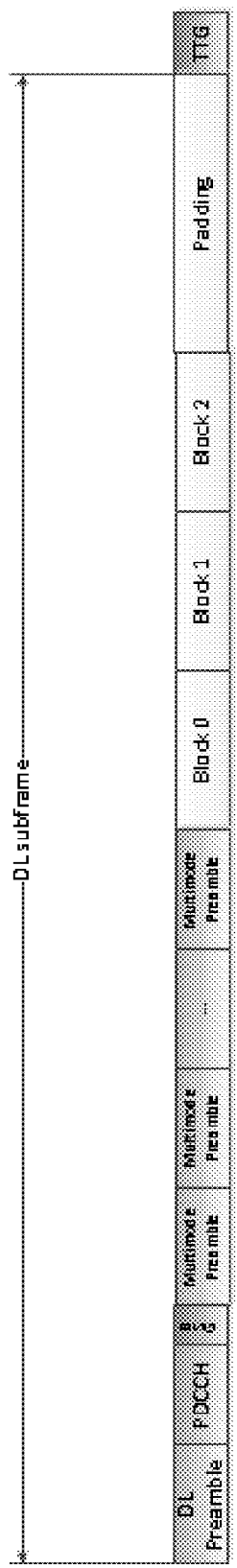
FIG. 7 shows schematically an example of a DL frame structure for implementing RBM mode selection in a dual-carrier wireless backhaul system according to an embodiment of the present invention.

FIG. 7 shows an example of a special DL (downlink) Frame Structure which may be used to implement RBM mode selection. It includes a multi-mode preamble for each RBM reception mode. The subframe is transmitted right after initial ranging, e.g. during RBM registration, allowing the RBM to train the equalizer and decode a known data burst. The RBM then evaluates the CINR increase for each available reception mode relative to the baseline reception mode. Time is divided into cycles and each cycle comprises a data collection phase, a parameter selection phase and a parameter application phase.

In the data collection phase, each network node reports its parameter and performance metrics to a processing unit, typically a centralized control server 200. Alternatively processing may be distributed across local processor units of one or more serving Hubs. Parameters and performance metrics may comprise, for example, transmit power levels, received power levels, pathloss per antenna, noise covariance per antenna, CINR, serving geometry, spectral efficiency and throughput.

In the parameter selection phase, based on data collected, and a pre-defined system objective, e.g. proportional fairness or other objective, the processing unit decides which reception mode is to be used for each RBM, and also provides an RF/antenna coordination In the parameter application phase, command messages are sent from the processing unit to the corresponding RBMS, and each RBM switches to the selected reception mode, and to the corresponding RF/antenna coordination option. In the case where explicit control signalling is needed to facilitate the reception mode selection of some of the multi-mode RBMs, network nodes are instructed when and how to exchange the required information to enable the selected reception mode and RF/antenna coordination option.

Figure 8:
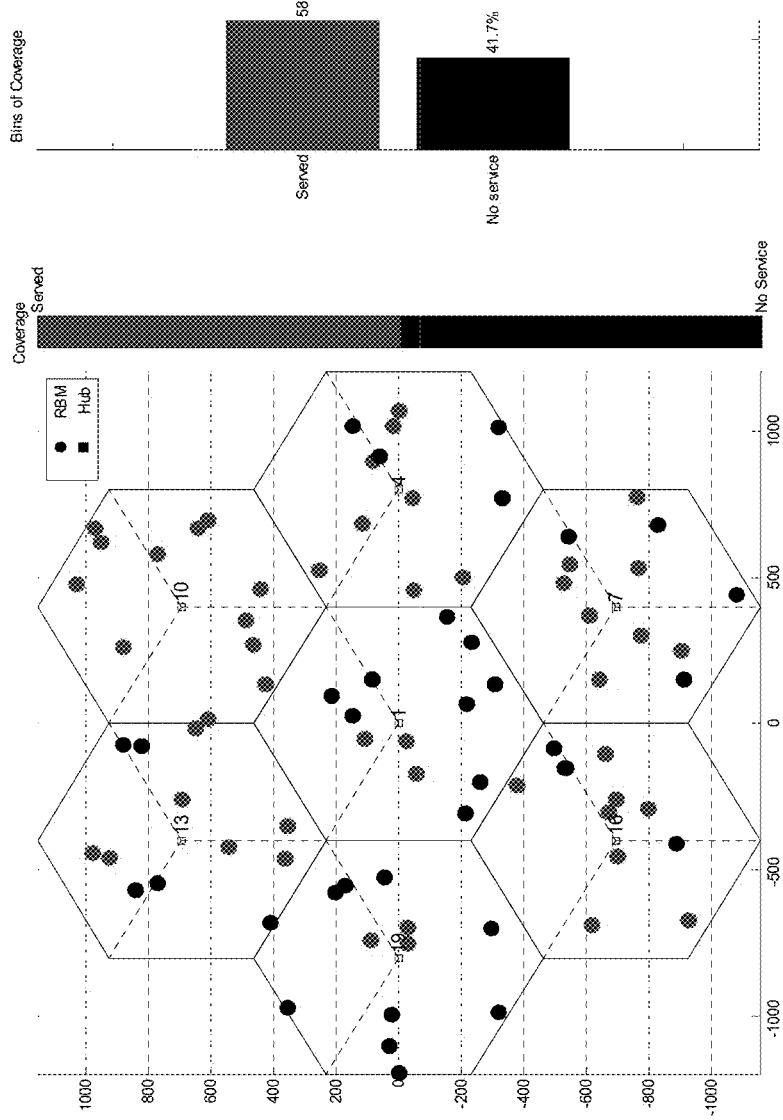
FIG. 8 illustrates schematically a wireless backhaul network topology map for a network similar to that shown in FIG. 1, and for which coverage for each RBM on the primary channel is indicated by a colour mapping.

As an example, FIG. 8 shows schematically a network topology map similar to that of FIG. 1, in which coverage is indicated by colour coding, i.e. RBMs with and without service. RBMs without service are identified, and then RBMs that are either link budget challenged or interference challenged are identified.

Figure 9A:
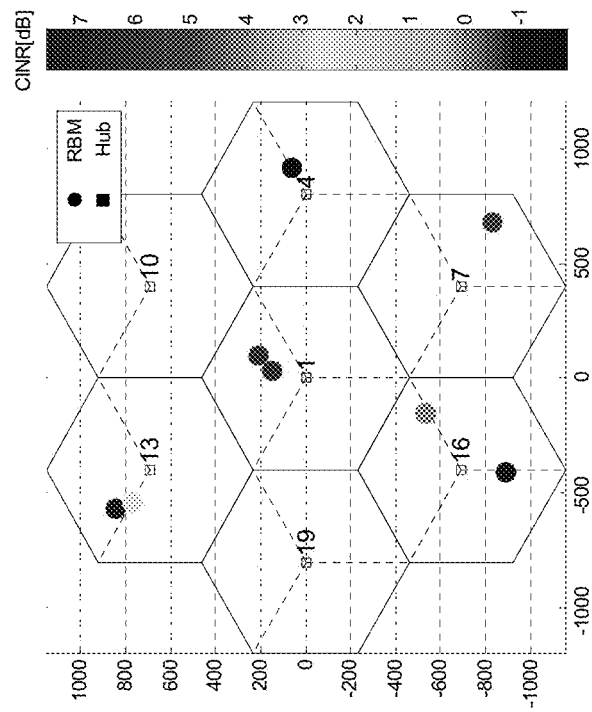
FIG. 9A illustrates schematically a wireless backhaul network topology map for a network similar to that shown in FIG. 1, indicating which RBMS are link budget challenged.
Figure 9B:
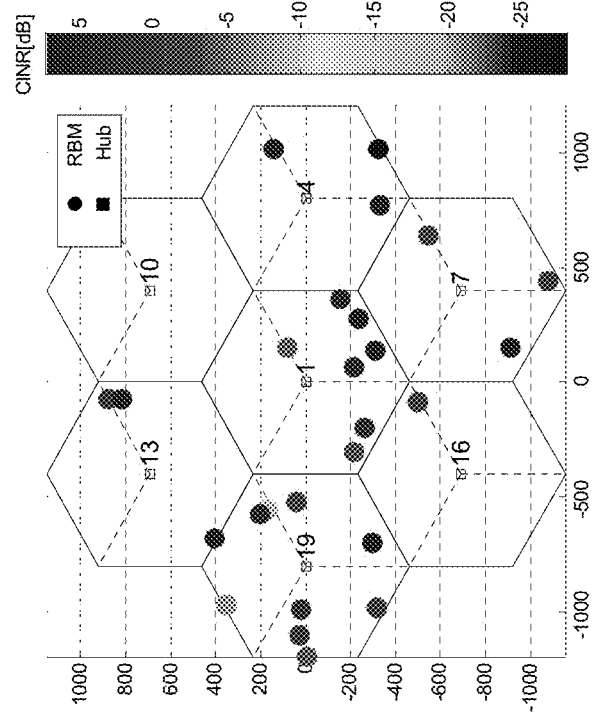
FIG. 9B illustrates schematically a wireless backhaul network topology map for a network similar to that shown in FIG. 1, indicating which RBMS are interference challenged.

FIG. 9A shows schematically a topology map of link budget challenged RBMs, represent about 30% of the total RBMs, for a fade margin of 8 dB. FIG. 9B shows schematically a topology map of interference challenged RBMs, which represent about 10% of the total RBMs.

Reception Modes

Various algorithms may be used to provide interference cancellation for each reception mode using only single carrier operation. The baseline reception mode refers the default mode with no RF or antenna resource borrowing between the first and second RF chains.

For signal domain successive interference cancellation (SIC), hard or soft successive interference cancellation, i.e. Hard SIC or Soft SIC, may be performed. For Hard SIC, an interfering signal is decoded into hard bits such as binary bits. For Soft SIC, an interfering signal is decoded into soft bits such as log-likelihood rations. These hard or soft bits are subtracted from the received signal. Its own desired signal is then decoded.

For signalling, explicit Modulation and Coding Scheme (MCS) information is exchanged from neighboring Hubs so that an RBM knows the MCS of an interfering transmission.

In wireless backhaul networks with fixed Hubs and RBMs, the number of MCS options of an interfering transmission is limited, so blind decoding by an exhaustive search is feasible Other reception modes comprising single carrier operation with Interference rejection combining (IRC) or Maximal radio combining (MRC) may be implemented.

For a spatial domain IRC reception mode, usually, no explicit signalling is required if the transmit power levels are fixed, since the noise covariance is relatively constant. In case of dynamic power control, explicit transmit power level information exchange can help estimate the noise covariance.

For a spatial domain MRC reception mode, no explicit signalling is required except standard channel estimates or pilots.

Combined SIC-IRC or combined SIC-MRC reception modes may be used.

Simulation Results

Figure 10:
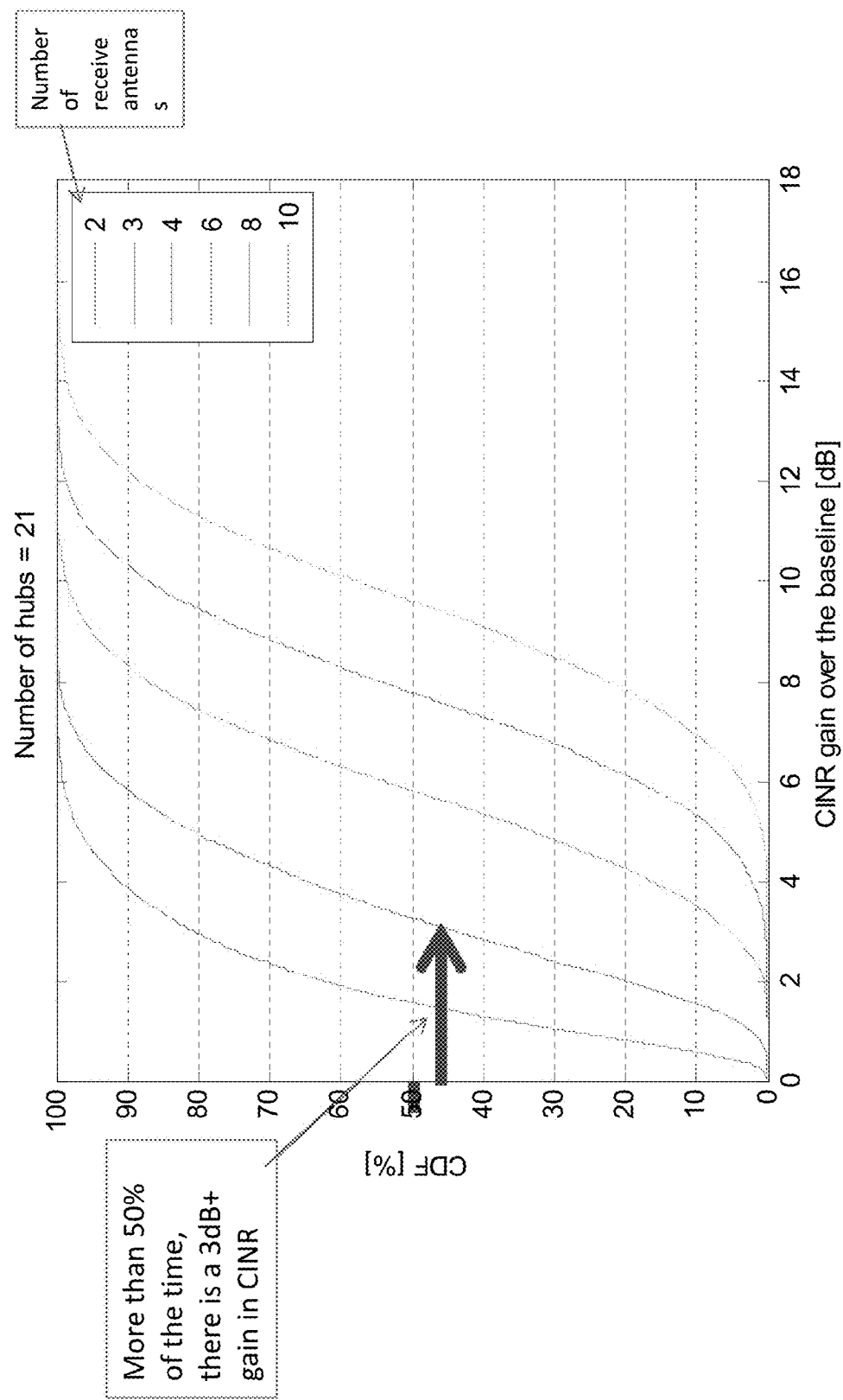
FIG. 10 shows plots of Cumulative Distribution Function (CDF) (%) vs. CINR gain over baseline (dB) for multi-mode RBMs with 2, 3, 4, 6, 8 and 10 receive antennas.

By way of example, FIG. 10 shows simulation results for performance for spatial domain IRC for a network toplogy comprising 21 Hubs, i.e. similar to the network topology shown in FIG. 1 and FIGS. 9A and 9B. These plots show the CDF (%) vs. CINR gain over baseline (dB) for scenarios with 2, 3, 4, 6, 8 and 10 receive antennas per RBM. More than 50% of the time, there is a CINR gain of 3 dB or more.

Figure 11B:
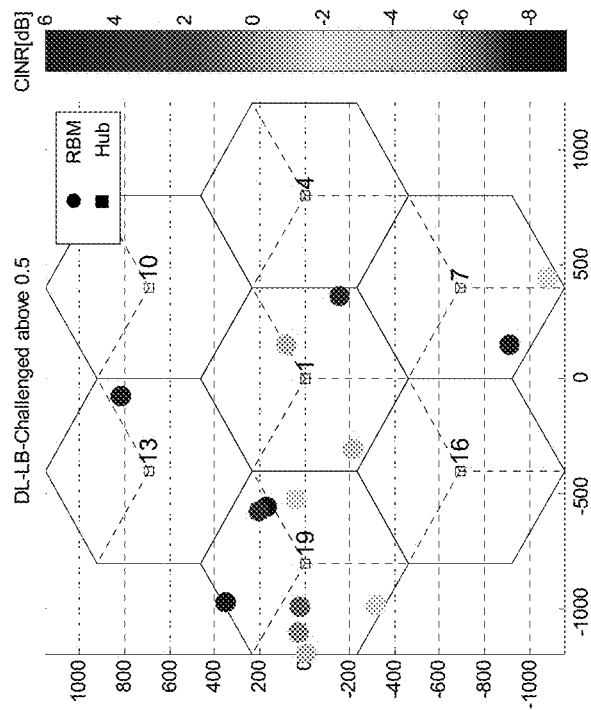
FIG. 11B illustrates schematically a wireless backhaul network topology map for a network similar to that shown in FIG. 9A, with colour mapping indicating CINR (dB) for link budget challenged RBMs, with implementation of 4RX spatial domain IRC.
Figure 11A:
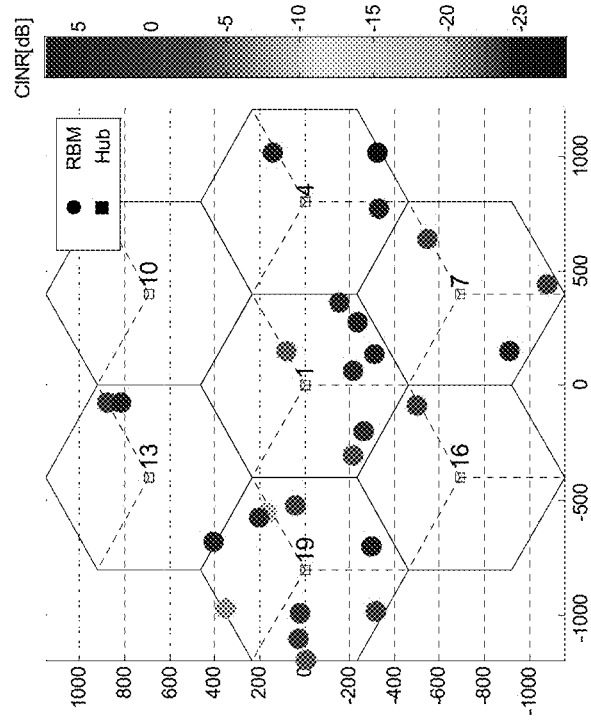
FIG. 11A illustrates schematically a wireless backhaul network topology map for a network similar to that shown in FIG. 9A, with colour mapping indicating CINR (dB) for link budget challenged RBMs without implementation of 4RX spatial domain IRC.

FIGS. 11A and 11B show CINR topology maps for link-budget challenged RBMS with and without 4RX spatial domain IRC. As shown, using 4RX spatial domain IRC, for fade margin 8 dB, there is a 6 dB system gain, and the number of link budget challenged RBM is reduced from about 30% to about 15%.

Thus, systems and method according to embodiments of the invention provide for aggregation of RF circuitry and antenna elements of a dual-carrier hardware platform to allow dynamic reception mode switching on the primary carrier. The antenna design concept facilitates switching between different operational modes, while providing relatively low cost and high RF performance. The reception mode may be selected based on metrics comprising one or more of transmit power levels, received power levels, antenna gain patterns, pathloss per antenna, channel estimates, noise covariance per antenna, CINR, serving geometry, spectral efficiency, and throughput.

Beneficially, the system enables a measurement of a system gain, and reporting thereof, for each of the available RBM reception modes.

The design of the antenna systems and RF Front End modules of the multi-mode RBMs offers flexibility in switching between different operational modes or reception modes, for improved system performance. For example, available RBM reception modes may include:
  MIMO Dual Carrier operation for no interference environments and good link connections for both carriers.

MIMO Single Carrier with an IRC algorithm for high interference environments.

MIMO Single Carrier with an MRC algorithm for better performance while only one carrier can be used.

These operational modes may be implemented with or without DCJS.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A method for reception mode switching in a dual-carrier fixed wireless backhaul network comprising a plurality of nodes, said nodes comprising a plurality of Hub modules, each serving one or more remote backhaul modules (RBMs) through Hub-RBM radio links, the method comprising deploying RBMs comprising multimode RBMs which are selectively operable in a plurality of reception modes comprising a baseline reception mode and one or more other reception modes, using a primary carrier and a secondary carrier, the primary carrier being a licensed band and the secondary carrier being a lower cost shared band or an unlicensed band, wherein each multi-mode RBM comprises first and second Radio Frequency (RF) chains, the first RF chain comprising RF hardware and antenna elements for receiving and transmitting (RX/TX) on the primary carrier and the second RF chain comprising RF hardware and antenna elements configurable for RX/TX on the secondary carrier or for RX on the primary carrier;

in a data collection phase:
obtaining baseline performance measurements for each RBM operating in the baseline reception mode, wherein the first RF chain operates for RX/TX on the primary carrier,
identifying from said baseline performance measurements interference-challenged RBMs or link budget-challenged RBMs,
for each interference-challenged RBM and link budget-challenged RBM obtaining further performance measurements for each of said one or more other RBM reception modes,
said one or more other reception modes comprising at least a first reception mode with antenna/RF chain aggregation and resource borrowing on the primary carrier, wherein the first RF chain operates for RX/TX on the primary carrier and the second RF chain operates for RX on the primary carrier;

in a parameter selection phase:
based on said baseline performance measurements and further performance measurements for each interference-challenged RBM or link budget-challenged RBM, selecting from said plurality of reception modes a reception mode which provides a performance gain relative to the baseline reception mode; and in a parameter application phase:
for each interference-challenged RBM or link budget-challenged RBM, switching to a respective selected reception mode.

2. The method of claim 1, wherein selecting a reception mode for each link-budget challenged RBM or interference-challenged RBM comprises:
a) for link-budget challenged RBMs, selecting said first RBM reception mode with antenna/RF chain aggregation on the primary carrier; and
b) for interference-challenged RBMs, (i) configuring the first RF chain for RX/TX on the primary carrier and the second RF chain for RX/TX on the secondary carrier without aggregation or resource borrowing of elements of the first and second RF chains and triggering Dual Carrier Joint Scheduling (DCJS); or (ii) selecting said first RBM reception mode with antenna/RF chain aggregation on the primary carrier.

3. The method of claim 2, wherein said one or more other reception modes further comprise a spatial domain Interference Rejection Combining (IRC) mode comprising single carrier operation in said first reception mode with spatial domain IRC.

4. The method of claim 2, wherein said one or more other reception modes further comprise a spatial domain Maximal Radio Combining (MRC) mode comprising single carrier operation in said first reception mode with spatial domain MRC.

5. The method of claim 2, wherein said one or more other reception modes further comprise a signal domain Successive Interference Cancellation (SIC) mode comprising single carrier operation in said first reception mode with signal domain SIC.

6. The method of claim 5, wherein the signal domain Successive Interference Cancellation (SIC) mode further comprises one of spatial domain Interference Rejection Combining (IRC) and spatial domain Maximal Radio Combining (MRC).

7. The method of claim 1, wherein switching to a respective selected reception mode comprises signaling to a baseband processor of each RBM the selected reception mode, and configuring connections between the first and second RF chains of the RBM for operating in the selected reception mode.

8. The method of claim 1, wherein selecting a reception mode for improved system performance is based on a performance gain for each multi-mode RBM that meets a system objective comprising a proportional fairness objective.

9. The method of claim 1, wherein selecting a reception mode which provides a performance gain relative to the baseline reception mode comprises:
a) selecting a reception mode to improve received Carrier-to-Interference-plus-Noise Ratio (CINR) based on available knowledge at a receiver of the multi-mode RBM; or
b) selecting a reception mode to improve received CINR on receiving instructions from a central processor which determines the reception mode based on information reported by network nodes.

10. The method of claim 1, wherein, in the baseline reception mode, the first RF chain is configured for RX/TX on the primary carrier and the second RF chain is configured for RX/TX on the secondary carrier without aggregation or resource borrowing of elements of the first and second RF chains.

11. The method of claim 1, wherein the primary carrier is a licensed band and the secondary carrier is an unlicensed band comprising a plurality of channels, and wherein control signaling messages for RBMs assigned to the secondary carrier comprise a channel assignment and a fall back channel assignment.

12. The method of claim 1, wherein obtaining said further performance measurements comprises: using a special downlink/uplink (DL/UL) sub-frame to evaluate said further performance measurements for each of said one or more other reception modes.

13. The method of claim 1, wherein obtaining said performance measurements and further performance measurements comprises obtaining performance metrics comprising one or more of: transmit power levels, received power levels, pathloss per antenna, noise covariance per antenna, Carrier-to-Interference-plus-Noise Ratio (CINR), serving geometry, spectral efficiency and throughput.

14. The method of claim 1, wherein for each RBM, said steps of obtaining baseline performance measurements and said further performance measurements for the interference-challenged RBMs and link-budget challenged RBMs are performed in a processing unit of the serving Hub of the respective RBM.

15. The method of claim 1, wherein for each RBM, said steps of obtaining said baseline performance measurements and said further performance measurements for each of the interference-challenged RBMs and link-budget challenged RBMs are coordinated by a centralized processing unit of the network.

16. The method of claim 15, wherein the selected reception mode for each RBM is shared by signaling between each RBM and its serving Hub, and signaling between each Hub and the centralized processing unit.

17. The method of claim 16, wherein said signaling is communicated by control channel signaling on the primary carrier.

18. A system comprising a dual-carrier fixed wireless backhaul network comprising a plurality of nodes, said nodes comprising a plurality of Hub modules, each serving one or a plurality of remote backhaul modules (RBMs) through Hub-RBM radio links, and wherein at least some of the RBMs comprise multi-mode RBMs that are selectively operable in a plurality of reception modes comprising a baseline reception mode and one or more other reception modes using a primary carrier and a secondary carrier, wherein the primary carrier is a licensed band and the secondary carrier is a lower cost shared band or an unlicensed band, each multi-mode RBM comprising first and second RF chains, the first RF chain comprising RF hardware and antenna elements for receiving and transmitting (RX/TX) on the primary carrier and the second RF chain comprising RF hardware and antenna elements configurable for RX/TX on the secondary carrier or for RX on the primary carrier, and switching means for switching between the baseline reception mode and said one or more other reception modes by signaling a selected reception mode to a baseband processor of each RBM and configuring a connection between the first and second RF chains of the RBM for operating in the selected reception mode;

wherein in the baseline reception mode: the first RF chain operates for RX/TX on the primary carrier and the second RF chain operates for RX/TX on the secondary carrier; and wherein the one or more other reception modes comprise at least a first reception mode with antenna/RF chain aggregation and resource borrowing on the primary carrier, wherein the first RF chain operates for RX/TX on the primary carrier and the second RF chain operates for RX on the primary carrier.

19. The system of claim 18, wherein:
a) the switching means comprises a processing unit configured for selecting a reception mode to improve received Carrier-to-Interference-plus-Noise Ratio (CINR), relative to received CINR for the baseline reception mode, based on available knowledge at a receiver of the RBM; or
b) the switching means comprises a processing unit configured for selecting a reception mode to improve received CINR, relative to received CINR for the baseline reception mode, on receiving instructions from a central processor which determines the selected reception mode based on information reported by network nodes.

20. The system of claim 19, wherein each RF chain comprises N antenna elements, where N≥2.

21. The system of claim 20, wherein each antenna element comprises a multibeam antenna element and the first RF chain comprises a first beam selection module and the second RF chain comprises a second beam selection module.

22. The system of claim 21, wherein each of the first and second RF chains comprise dual polarization channels.

23. The system of claim 21, wherein the first and second RF chains of each multi-mode RBM comprise, respectively, a first Multiple-Input Multiple-Output (MIMO) RF front end that supports the primary carrier for TX/RX MIMO mode and a second MIMO RF front end that supports that supports the secondary carrier for TX/RX MIMO mode and the primary carrier for RX MIMO mode.

24. The system of claim 23, wherein each beam selection module is configured for at least one of:
combining multiple beams to generate narrower and wider beams;
selecting antenna polarization to increase MIMO capabilities per carrier; and
selecting two separate antennas for the primary carrier.

25. The system of claim 23, wherein the antenna elements and RF front ends of multi-mode RBMs are switchable between reception modes comprising:
a) MIMO dual carrier operation for no interference environments and link connections for both carriers;
b) MIMO single carrier with Interference Rejection Combining (IRC) for high interference environments; and
c) MIMO single carrier with Maximal Ratio Combining (MRC) for in-between performance while only one carrier can be used.

26. The system of claim 21, wherein the first and second beam selection modules communicate with RX Multiple-Input Multiple-Output (MIMO) on the primary carrier.

* * * * *